(12) United States Patent
Newson (10) Patent No.: US 12,084,795 B2
(45) Date of Patent: Sep. 10, 2024

(54) METHOD FOR CREATING LUGGAGE, PARTICULARLY A FLEXIBLE OR SEMI-RIGID TRAVEL BAG

(71) Applicant: LOUIS VUITTON MALLETIER, Paris (FR)

(72) Inventor: Marc Newson, London (GB)

(73) Assignee: LOUIS VUITTON MALLETIER, Paris (FR)

( * ) Notice: Subject to any disclaimer, the term of this patent is extended or adjusted under 35 U.S.C. 154(b) by 700 days.

(21) Appl. No.: 17/267,592

(22) PCT Filed: Aug. 8, 2019

(86) PCT No.: PCT/EP2019/071376
§ 371 (c)(1),
(2) Date: Feb. 10, 2021

(87) PCT Pub. No.: WO2020/030765
PCT Pub. Date: Feb. 13, 2020

(65) Prior Publication Data
US 2021/0310163 A1    Oct. 7, 2021

(30) Foreign Application Priority Data
Aug. 10, 2018    (FR) ...................................... 1857439

(51) Int. Cl.
*D04B 1/22*    (2006.01)
*A45C 5/03*    (2006.01)
(Continued)

(52) U.S. Cl.
CPC .................. *D04B 1/22* (2013.01); *A45C 5/03* (2013.01); *A45C 5/14* (2013.01); *A45C 13/103* (2013.01);
(Continued)

(58) Field of Classification Search
CPC .. D04B 1/22; D04B 21/20; A45C 5/03; A45C 5/14; A45C 13/103; A45C 13/262;
(Continued)

(56) References Cited

U.S. PATENT DOCUMENTS 1,385,384 A * 7/1921 Mashek ................. A45C 13/26
                                                      190/902
3,239,110 A * 3/1966 Buter ....................... B65D 5/42
                                                      222/541.6
(Continued)

FOREIGN PATENT DOCUMENTS

CN    106941776 A    7/2017
EP    0806190 A1    11/1997
(Continued)

OTHER PUBLICATIONS

Korean Office Action related to Application No. 10-2021-7004410; reported on Oct. 4, 2023.
(Continued)

*Primary Examiner* — Lawrence Averick
(74) *Attorney, Agent, or Firm* — von Briesen & Roper, s.c.

(57) ABSTRACT

A method for creating a luggage bag, said method comprising the following operations: a) creating a one-piece casing having an inner surface and an outer surface, the casing being flexible, the casing having a housing and a flap, the flap being designed for placement in a folded-in position in which the casing has an interior volume and a slit extending between the housing and the flap, there being one continuous slit, and b) attaching a sealing device on the housing and the flap, at the slit.

15 Claims, 7 Drawing Sheets

(51) Int. Cl.
*A45C 5/14* (2006.01)
*A45C 13/10* (2006.01)
*A45C 13/26* (2006.01)
*B29C 51/02* (2006.01)
*B29L 31/00* (2006.01)
*D04B 21/20* (2006.01)

(52) U.S. Cl.
CPC ............ *A45C 13/262* (2013.01); *B29C 51/02* (2013.01); *D04B 21/20* (2013.01); *A45C 2005/035* (2013.01); *A45C 2013/267* (2013.01); *B29L 2031/7128* (2013.01)

(58) Field of Classification Search
CPC ........ A45C 2005/035; A45C 2013/267; A45C 2005/032; A45C 13/001; A45C 13/26; B29C 51/02; B29C 51/00; B29L 2031/7128; B29K 2077/00
USPC ...... 190/115, 118, 121, 26; 16/404; D8/300; D3/201
See application file for complete search history.

(56) References Cited

U.S. PATENT DOCUMENTS

| | | | |
|---|---|---|---|
| 6,630,414 B1* | 10/2003 | Matsumoto | A47C 31/006 428/116 |
| 9,231,475 B2* | 1/2016 | Takahashi | H02M 3/156 |
| 9,302,834 B2* | 4/2016 | Campesino | B65D 1/0276 |
| 10,959,506 B2* | 3/2021 | Heston | A45C 13/02 |
| 2011/0155526 A1* | 6/2011 | Cheng | A45C 13/103 190/102 |
| 2019/0344477 A1* | 11/2019 | Huffa | B29B 11/16 |
| 2020/0170387 A1* | 6/2020 | Heston | A45F 3/04 |
| 2020/0189147 A1 | 6/2020 | Conze et al. | |

FOREIGN PATENT DOCUMENTS

| | | |
|---|---|---|
| EP | 3143898 A2 | 3/2017 |
| JP | 2008011737 A | 1/2008 |
| JP | 3166588 U | 3/2011 |
| JP | 2013517080 A | 5/2013 |
| JP | 2016198495 A | 12/2016 |
| JP | 2017511730 A | 4/2017 |
| JP | 2017148613 A | 8/2017 |
| KR | 20160104918 A | 9/2016 |
| KR | 20160129878 A | 11/2016 |
| WO | 2015/134956 A1 | 9/2015 |
| WO | 2016053387 A1 | 4/2016 |

OTHER PUBLICATIONS

Chinese Office Action related to Application No. 201980053489.X reported on Dec. 24, 2021.

Wonseok Choi, Ph.D. et al., "Three Dimensional Seamless Garment Knitting on V-Bed Flat Knitting Machines". vol. 4, Issue 3, Spring 2005. Article Designation: Refereed JTATM, pp. 1-33.

* cited by examiner

METHOD FOR CREATING LUGGAGE, PARTICULARLY A FLEXIBLE OR SEMI-RIGID TRAVEL BAG

CROSS-REFERENCE TO RELATED APPLICATION

This Application is a 35 USC § 371 US National Stage filing of International Application No. PCT/EP2019/071376 filed on Aug. 8, 2019 and claims priority under the Paris Convention to French Patent Application No. 18 57439 filed on Aug. 10, 2018.

FIELD OF THE DISCLOSURE

The present invention relates to a method for creating luggage, in particular for creating luggage of the flexible or semi-rigid travel bag type.

CONTEXT OF THE INVENTION

The creation of a luggage bag of the flexible or semi-flexible travel bag type generally comprises the creation of different distinct elements, then the assembly of the various elements by gluing or sewing in a plurality of joining areas and concealment of the various joining areas by a welt.

The present invention aims to improve the robustness of the luggage bag and its harmonious aesthetics, and to simplify its implementation.

BACKGROUND OF THE DISCLOSURE

According to the invention, the method comprises the following operations:
  a) creating a one-piece casing having an inner surface and an outer surface, the casing being flexible, the casing having a housing and a flap, the flap being suitable for placement in a folded-in position in which the casing has an interior volume (defined by the inner surface) and a slit, the slit extending between the housing and the flap, there being one (single) continuous slit, and
  b) attaching a sealing device on the housing and the flap, at the slit.

"Creating a one-piece casing" is understood to mean that the casing is not made from several distinct elements but directly as one piece, so that there is no discontinuity in the material, in particular no sewing or gluing or the like.

Thus, as the luggage bag does not have a plurality of joining areas, the mechanical weakness due to a plurality of these joining areas is reduced. In addition, it is possible to create a repeating pattern with uniform repetition over a larger expanse of the luggage bag. Finally, there is only one piece to be made to form the casing.

According to another characteristic of the invention, preferably during operation a), the casing is entirely created by knitting, using at least one structural yarn.

Thus, the at least one yarn extends continuously over the entire casing while providing a casing that is shapeable in three dimensions, for a wide variety of casing shapes.

According to a complementary characteristic of the invention, preferably the at least one structural yarn is knitted with a first density in a first area of the casing and the at least one structural yarn is knitted with a second density in a second area of the casing, the second density being greater than the first density. The second density is preferably substantially twice the first density, or even more than twice the first density.

The second area is thus reinforced relative to the first area, which improves the robustness of the luggage bag while reducing the cost and weight compared to luggage in which the casing is made entirely at the second density.

According to yet another complementary characteristic of the invention, preferably the creation of the casing during operation a) comprises the use of at least two structural yarns of different colors.

Thus, by having each of the colors appear on the casing in a predefined pattern, the luggage bag is directly created with the desired pattern. The two yarns of different colors can either be joined one after the other, or knitted together in a manner known in the field of wool knitting in particular, so that the back face pattern will be the opposite of the front face pattern.

According to another characteristic of the invention, preferably the creation of the casing during operation a) comprises the use of a thermoplastic polymer material, preferably copolyester or copolyamide, and then the thermoforming of the casing.

The flexibility of the luggage bag can thus be adjusted by varying the amount of thermoplastic polymer material used in the casing: a high presence of thermoplastic polymer material tends to allow the luggage bag to retain its shape and not collapse.

According to another characteristic of the invention, the creation of the casing during operation a) comprises the use of a polyamide structural material.

The use of polyamide is advantageous for the wear resistance and abrasion resistance of the luggage and allows relatively easy production.

Preferably, according to the invention, the creation of the casing during operation a) comprises:
  creating the housing with a main face, a first longitudinal face, a second longitudinal face, a first transverse face, and a second transverse face,
  creating the flap in substantially flat form, preferably corresponding to the main face, and
  the flap designed to be placed in an open position in which the flap is substantially in the extension of the second transverse face and in the folded-in position, with the slit extending around the flap and only along the first longitudinal face, the second longitudinal face, and the first transverse face.

Creation of the casing is thus facilitated.

According to another characteristic of the invention, preferably during operation b), a rigid shell is fixed to the housing and to the flap, on each side of the slit, over the entire slit.

Thus, not only does the rigid shell increase the strength of the luggage bag and therefore increase the weight the luggage bag can carry and/or its interior volume, but it also allows maintaining the casing on both sides of the slit.

According to a complementary characteristic of the invention, the rigid shell is preferably fixed to the inner face of the casing.

The outer face of the casing thus remains visible.

In addition, preferably, in accordance with the invention, the method comprises:
  during operation a), creating the slit in a U-shape comprising two longitudinal portions connected by a transverse portion, and
  during operation b), fixing a pulling device on the outer surface of the casing, the pulling device forming a sealing device and covering the entire slit.

The luggage bag can thus be moved by pulling it along by means of the pulling device, and the pulling device conceals the slit.

In addition, according to the invention, the method preferably further comprises the following characteristics:

the pulling device comprises a telescopic bar, two tubes, and a protective plate, the telescopic bar has two arms and a handle connecting the arms, the arms of the telescopic bar being mounted so as to slide in the tubes between a folded position and an extended position of the bar, the tubes are fixed on the outer surface of the casing and cover the longitudinal portions of the slit, and the protective plate is fixed on the outer surface of the casing and covers the transverse portion of the slit.

Thus, the bar can be placed either in a folded position when it is not required or in a deployed position for pulling the luggage bag, while keeping the slit concealed.

According to another characteristic of the invention, the method preferably comprises the following operations:

creating an access opening by cutting into the casing, and attaching a zipper in the access opening.

Thus, the access opening is established to allow ergonomic use of the luggage bag independently of the positioning constraints on the slit due to the creation of the casing.

The access opening preferably defines a flexible flap that can be moved to facilitate access to the interior volume.

According to yet another characteristic of the invention, the method preferably comprises the following operations:

making an incision by cutting into the casing, inserting an attachment portion of an accessory, through the incision, depositing glue between the attachment portion of the accessory and the casing, and sewing the attachment portion of the accessory to the casing, near the incision.

The accessory is thus attached to the casing in a robust and aesthetic manner, as the glue is not visible. The accessory is preferably a carrying strap or a storage pocket.

According to a complementary characteristic, the cut into the casing is preferably made by ultrasound.

DESCRIPTION OF THE DRAWINGS

Other features and advantages of the invention will become apparent from the following detailed description, with reference to the appended drawings in which.

DETAILED DESCRIPTION OF THE DISCLOSURE

Figure 1:
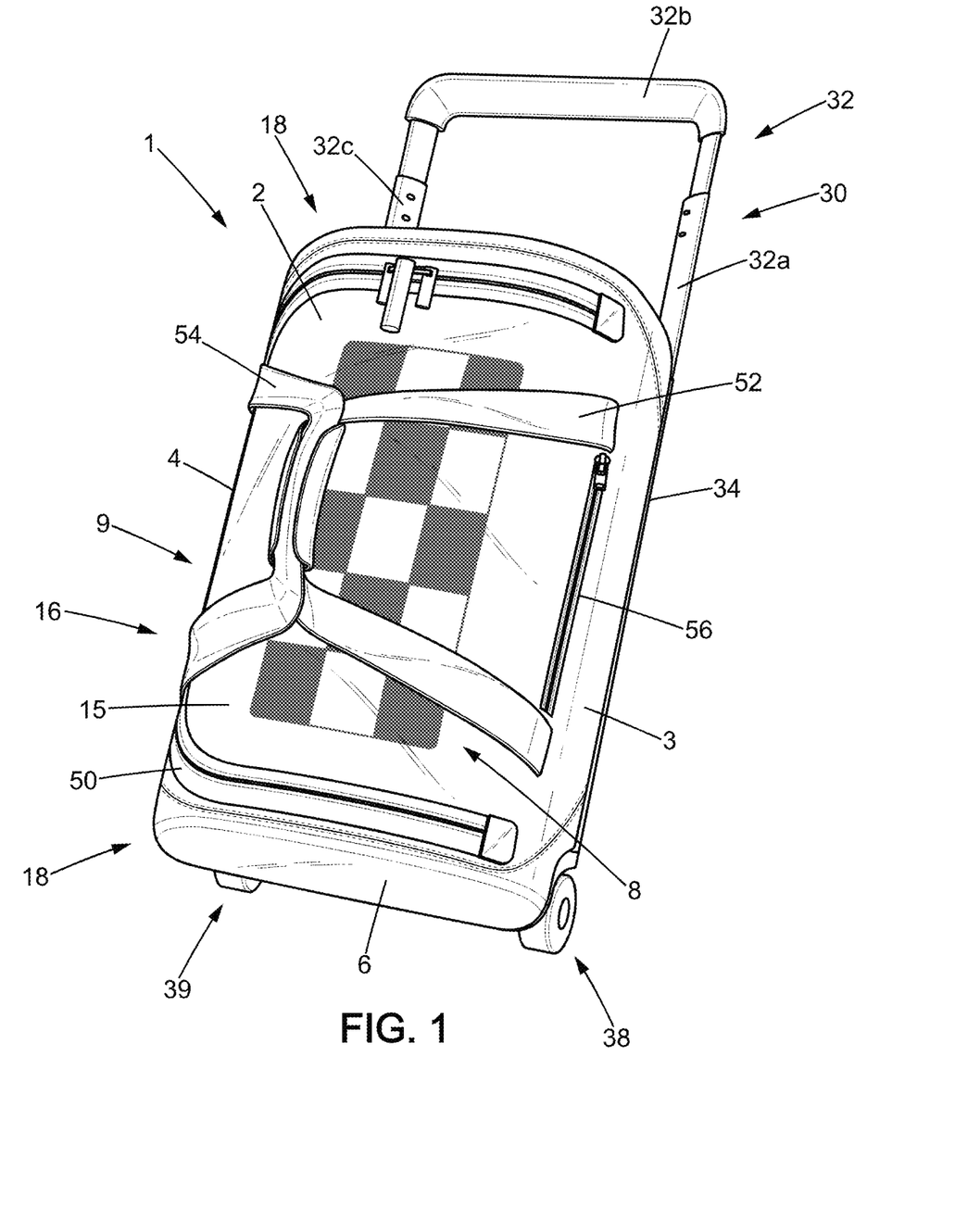
FIG. 1 illustrates a luggage bag according to the invention in a top perspective view.
Figure 2:
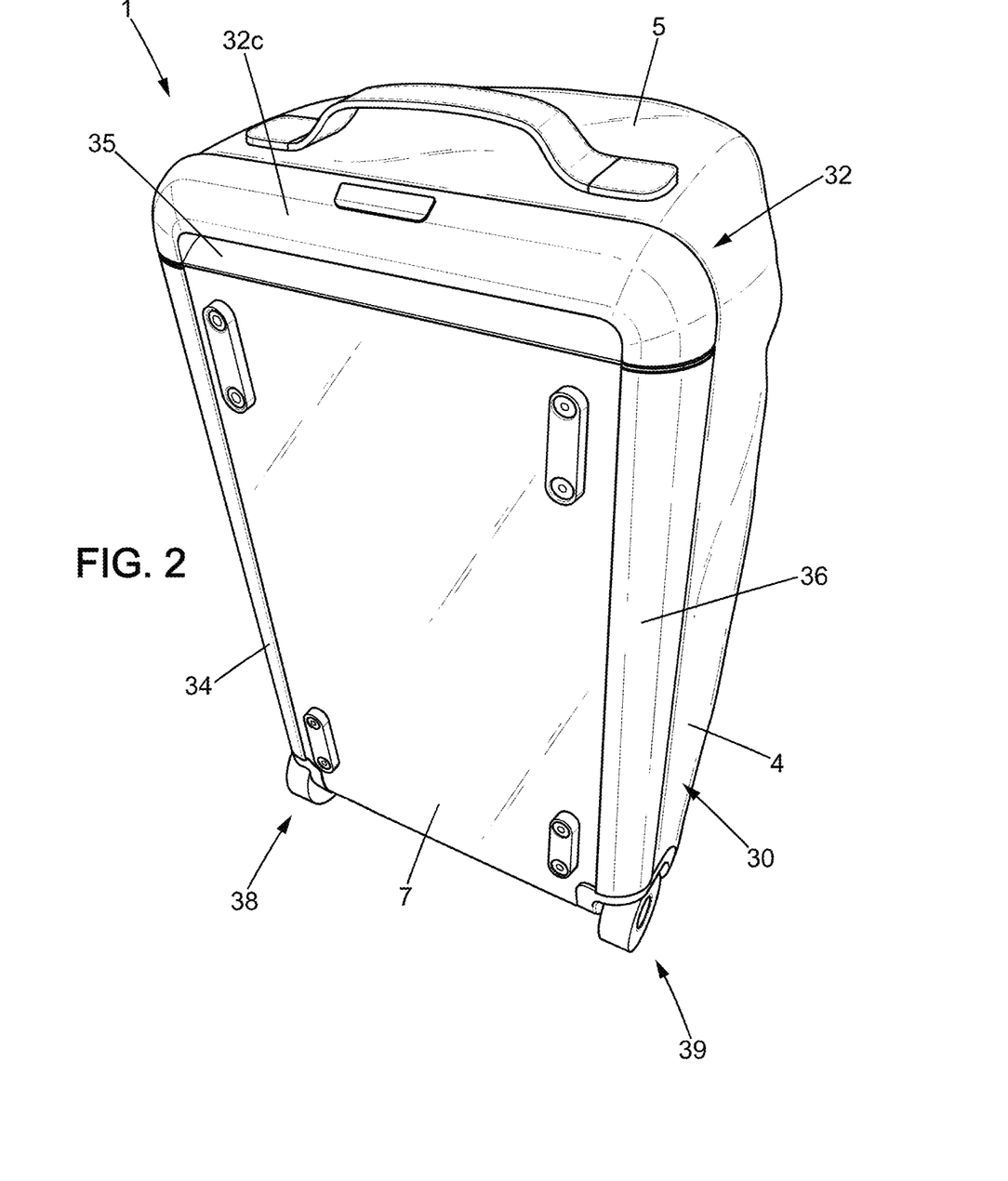
FIG. 2 illustrates a luggage bag according to the invention in a back perspective view.

FIGS. 1 and 2 illustrate a luggage bag 1 comprising a receptacle 9 intended for containing items and a pulling device 30 intended for moving the receptacle 9.

The receptacle 9 is of substantially parallelepipedal shape and comprises a main face 2, a rear face 7 opposite to the main face, a first longitudinal face 3, a second longitudinal face 4, a first transverse face 5, and a second transverse face 6.

The receptacle 9 has a zipper 50 extending substantially in the main face 2 and which makes it possible to release a flexible access flap 15 in order to access the interior of the receptacle 9. The receptacle 9 is equipped with two carrying straps 52, 54 for carrying it and a pocket 56, these forming accessories. The receptacle 9 has a first area 16 and a second area 18. The separation between the first area 16 and the second area 18 is illustrated by two dashed lines arranged one on each side of a continuous line. The second area 18 extends over the rear face 7 and next to the rear face 7, more precisely into the rear face 7, the first transverse face 5 and into the second transverse face 6 in the illustrated embodiment.

The pulling device 30 comprises a telescopic bar 32, a first tube 34, a second tube 36, and a protective plate 35. The telescopic bar 32 comprises two arms 32a, 32c and a handle 32b connecting the arms 32a, 32c. The arms 32a, 32c of the telescopic bar 32 are mounted to slide in the tubes 34, 36 between a retracted position (illustrated in FIG. 2) and an extended position of the bar 32 (illustrated in FIG. 1).

The first tube 34 extends along an edge of the luggage joining the rear face 7 and the first longitudinal face 3; the first tube 34 extends partly facing the rear face 7 and partly facing the first longitudinal face 3. The second tube 36 is parallel to the first tube 34 and extends along an edge of the luggage joining the rear 7 and the second longitudinal face 4; the second tube 36 extends partly facing the rear face 7 and partly facing the second longitudinal face 4. The protective plate 35 extends along an edge of the luggage joining the rear face 7 and the first transverse face 5; the protective plate 35 extends partly facing the rear face 7 and partly facing the first transverse face 5. The protective plate 35 connects the first tube 34 and the second tube 36.

The pulling device 30 further comprises a first wheel 38 and a second wheel 39. The first wheel is fixed in a corner of the receptacle 9 formed by the joining of the main face 2, the first longitudinal face 3, and the second transverse face 6. The second wheel 39 is fixed in a corner of the receptacle 9 formed by the joining of the main face 2, the second longitudinal face 4, and the second transverse face 6. In a variant, the luggage bag 1 could comprise two other wheels.

Figure 3:
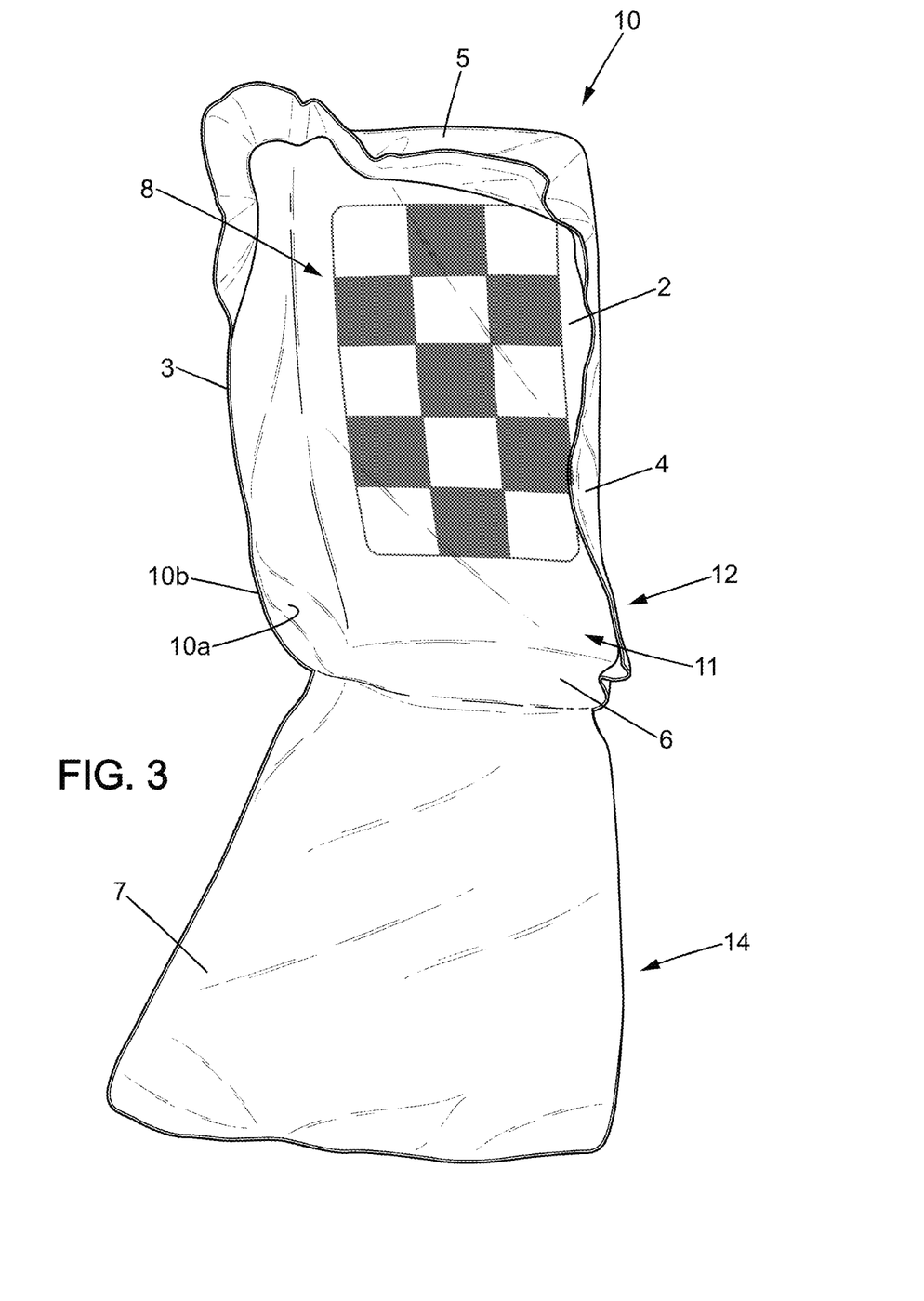
FIG. 3 illustrates a perspective view of a casing made during a first operation of a method for creating the luggage bag according to the invention.
Figure 4:
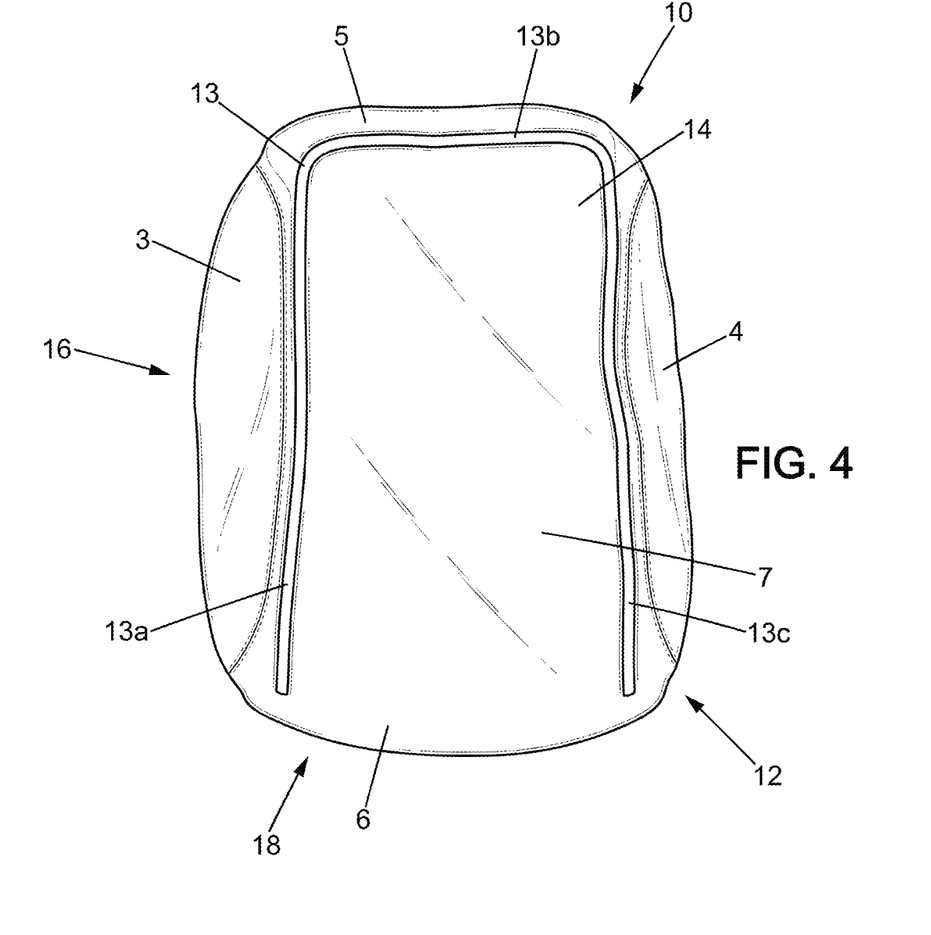
FIG. 4 illustrates the casing in a different configuration.
Figure 5:
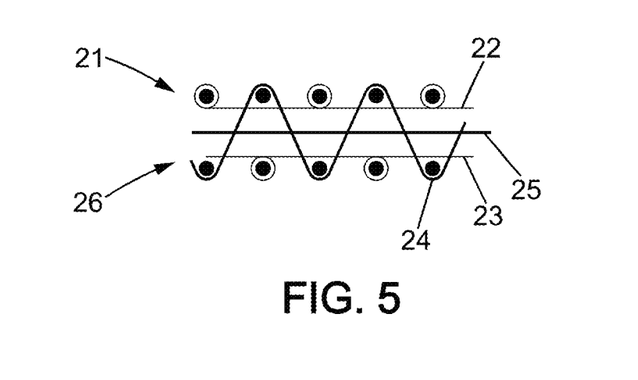
FIG. 5 illustrates the structure of the casing.

FIGS. 3 to 9 illustrate the creation of the luggage bag 1. As illustrated in FIGS. 3 to 5, the creation of the luggage bag 1 comprises the creation of a casing 10. The casing 10 has an inner surface 10a and an outer surface 10b. The casing 10 is made directly as one piece with continuity of the material, and is flexible.

The casing 10 integrates the main face 2, the first longitudinal face 3, the second longitudinal face 4, the first side face 5, the second side face 6, and the rear face 7. The casing 10 comprises a housing 12 and a casing flap 14. In the illustrated embodiment, the casing flap 14 substantially defines the rear face 7.

The casing flap 14 is able to be moved between an open position illustrated in FIG. 3 and a folded-in position illustrated in FIG. 4. In the open position, the casing flap 14 is substantially flat and extends substantially in the extension of the second transverse face 6. The open position preferably corresponds to the position in which the casing 10 is created. In the folded-in position, the casing flap 14 extends opposite the main face 2 and a slit 13 extends between the casing flap 14 and the housing 12. The casing 10 has an interior volume 11 which is separated from the exterior by the housing 12 and the casing flap 14. In the folded-in position, the inner volume 11 can communicate with the outside only by the single slot 13.

The slit 13 has a U-shape comprising a first longitudinal portion 13a, a transverse portion 13b, and a second longitudinal portion 13c. The first longitudinal portion 13a of the slit 13 extends along the edge joining the rear face 7 and the first longitudinal face 3. The transverse portion 13b of the slit 13 extends along the edge joining the rear face 7 and the first transverse face 5. The second longitudinal portion 13b of the slit 13 extends along the edge joining the rear face 7 and the second longitudinal face 4.

The casing 10 is formed of a succession of rows of loops flexibly linked to each other, so that the deformation of the loops gives the casing its flexibility in three dimensions. In the illustrated embodiment, the casing 10 is created by three-dimensional seamless knitting. Preferably, as illustrated in FIG. 5, the casing comprises a first structural yarn 22, a second structural yarn 23, an elastic yarn 24, and a yarn of hot-melt thermoplastic material 25.

"Thermoplastic" material is understood to mean a thermoplastic polymer which repeatably melts when heated above a certain temperature, and which returns to its solid state below that temperature.

The first structural yarn 22 and the second structural yarn 23 each extend continuously over the entire casing. The first structural yarn 22 extends along a first needle bed 21 and the second structural yarn 23 extends along a second needle bed 26. The first needle bed 21 corresponds to the inner surface 10a of the casing 10 and the second needle bed 26 corresponds to the outer face 10b of the casing 10. The first structural yarn 22 and the second structural yarn 23 are then brought back and forth between the first needle bed 21 and the second needle bed 26, in a specific pattern corresponding to the desired knit structure. By passing the first structural yarn 22 from the first needle bed 21 to the second needle bed 26 and passing the second structural yarn 23 from the second needle bed 26 to the first needle bed 21, a pattern 8 is formed by alternating the appearance. The pattern appearing on the inner surface 10a is the reverse of the pattern appearing on the outer surface 10b. In the illustrated embodiment, the pattern is formed on the main face 2.

The elastic yarn 24 is optional, but makes it possible to prevent the casing 10 from completely collapsing under its own weight after knitting, to facilitate the creation of the luggage in a harmonious manner (improving the aesthetics) and to improve the binding between the inner surface 10a of the casing 10, the outer surface 10b of the casing 10, and the core formed by the yarn of hot-melt thermoplastic material 25 in the illustrated embodiment. The elastic yarn 24 alternates between the first needle bed 21 and the second needle bed 26.

The yarn of hot-melt thermoplastic material 25 is held between the first needle bed 21 and the second needle bed 26.

The casing 10 has a first area 16 and a second area 18. In the second area 18, the stitches are tighter than in the first area 16, creating a greater density of stitches formed with the first structural yarn 22 and with the second structural yarn 23. In particular, in the second area 18, as the spacing between the needles is halved, the stitches with the first structural yarn 22 and with the second structural yarn 23 are twice as close, generating a doubled density. The second area 18 extends over the entire second transverse face 6 and slightly protrudes into the first longitudinal face 3 and the second longitudinal face 4.

Of course, the first structural yarn 22, the second structural yarn 23, the elastic yarn 24, and the yarn of hot-melt thermoplastic material 25 could be knitted to form different stitches in a manner different from the configuration illustrated in FIG. 5, these different stitches making it possible in particular to vary the density of the stitches formed with the first structural yarn 22 and/or the second structural yarn 23.

Alternatively, the casing could comprise only the first structural yarn 22 or a single yarn composed of alternating portions of the first structural yarn 22 and second structural yarn 23 joined end to end. The first structural yarn 22 and the second structural yarn 23 have a different appearance, in particular are of a different color.

For more information on the technique of three-dimensional seamless knitting, reference may be made to various documents describing this technique and in particular "Three dimensional seamless garment knitting on V-bed flat knitting machines" written by Wonseok Choi and Nancy B. Powell and published in the Journal of Textile and Apparel, Technology and Management, Volume 4, Issue 3, Spring 2005.

The first structural yarn 22 and the second structural yarn 23 are preferably made of polyamide, particularly of polyamide 6-6 known as Nylon®. Alternatively, the first structural yarn 22 and the second structural yarn 23 could in particular be made of polyester, acrylic, cotton, acetate, linen. Elastic yarn 24 is preferably based on polyamide and elastane. The hot-melt thermoplastic yarn is preferably made of copolyester (TPEE) or copolyamide.

After having been created, the casing 10 is preferably washed and impregnated with resin in order to give it a water-repellent and stain-resistant treatment.

Figure 6:
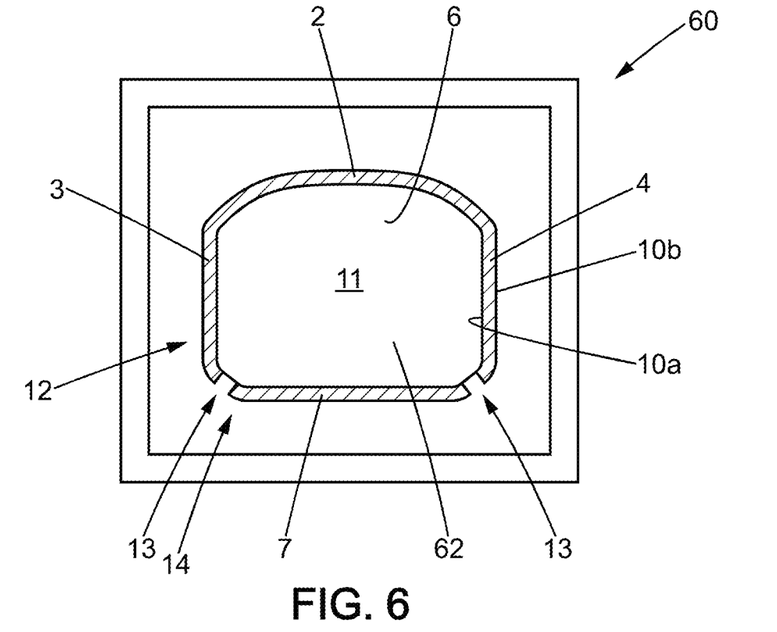
FIG. 6 illustrates a second operation in the creation of the luggage bag according to the invention.

Then, as shown in FIG. 6, a preform or a core 62 is placed in the interior volume 11 of the casing 10 while exerting slight force on the casing 10, to give it the desired shape. The core 62 and the casing 10 are placed in an oven 60 at a temperature preferably slightly less than 200 degrees for about fifteen to forty minutes. The temperature of the oven 60 must be sufficiently low to avoid damaging the material of the hot-melt thermoplastic yarn 25, or melting the first structural yarn 22 or the second structural yarn 23. Depending on the proportion of hot-melt thermoplastic yarn 25 present in the casing 10, as well as the material of the hot-melt thermoplastic yarn 25, the casing 10 is more or less rigid after thermoforming.

The process of thermoforming the knit is as follows:
placing the casing 10 on the core 62 corresponding to the technical surfaces used for the development of structural elements such as shells;
the core 62 covered with the casing 10 is then introduced into an oven 60 for 15 to 40 minutes between 180°C and 190° C.; the goal is to activate the chemical elements constituting the water-repellent treatment and then the hot-melt thermoplastic yarn 25;
upon exiting the oven, placement under vacuum in order to press the casing 10 onto the core 62 to ensure the complex geometries; this placement under vacuum is performed by means of a framework creating a vacuum bag around the tooling; the vacuum is maintained for 20 minutes, enough time for the hot-melt thermoplastic yarn 25 to fall below its softening temperature, in other words the temperature allowing it to solidify;

the casing 10 and the core 62 then enter a cold room in order to accelerate cooling of the part, and thus solidify the shape of the casing 10.

In order to increase production, the thermoforming process can be carried out on a production line having multiple stations, several casings 10 passing successively from one station to the next or progressing continuously from one end to the other of a production line that forms a closed loop.

Figure 7:
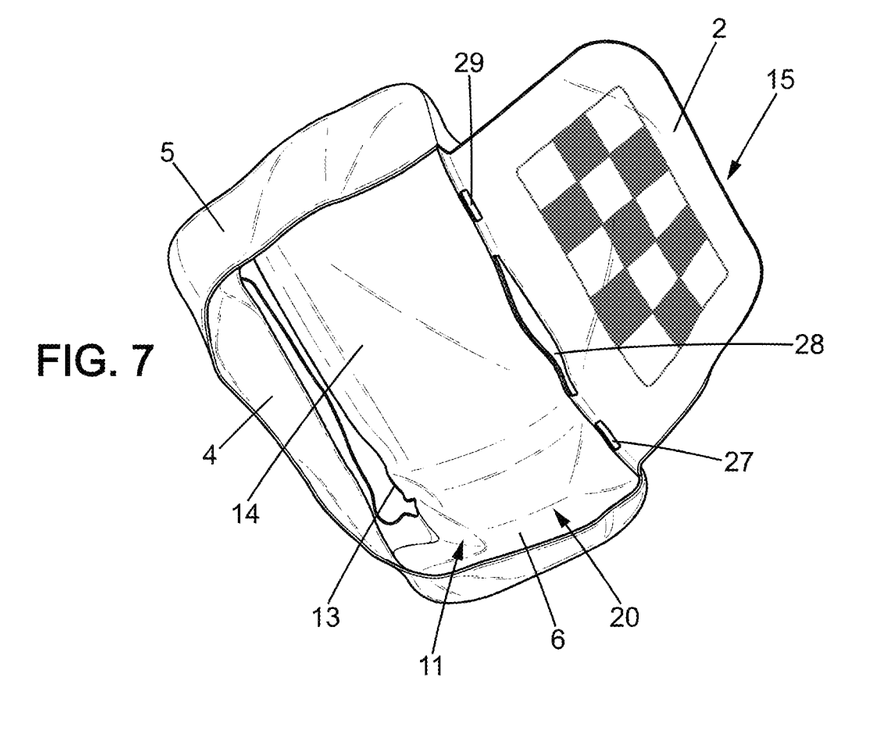
FIG. 7 illustrates a third operation in the creation of the luggage bag according to the invention.

As illustrated in FIG. 7, an access opening 20 is then made by cutting into the housing 12 and more specifically into the main face 2. The access opening 20 is created as a U-shape and defines the edge of the access flap 15 that can be opened by bending. Preferably, the access opening 20 extends near an edge of the casing 10 joining the main face 2 and the first transverse face 5, substantially along an edge of the casing 10 joining the main face 2 and the second longitudinal face 4, and near an edge of the casing 10 joining the main face 2 and the second transverse face 6. The bending to open and close the access flap 15 is substantially along an edge of the casing 10 joining the main face 2 and the first longitudinal face 3.

In addition, incisions 27, 28, 29 are then made in the casing 10 near the edge of the casing 10 joining the main face 2 and the first longitudinal face 3. A first end portion 52a and a second end portion 52b of carrying strap 52 are inserted through incisions 27, 29.

Figure 9:
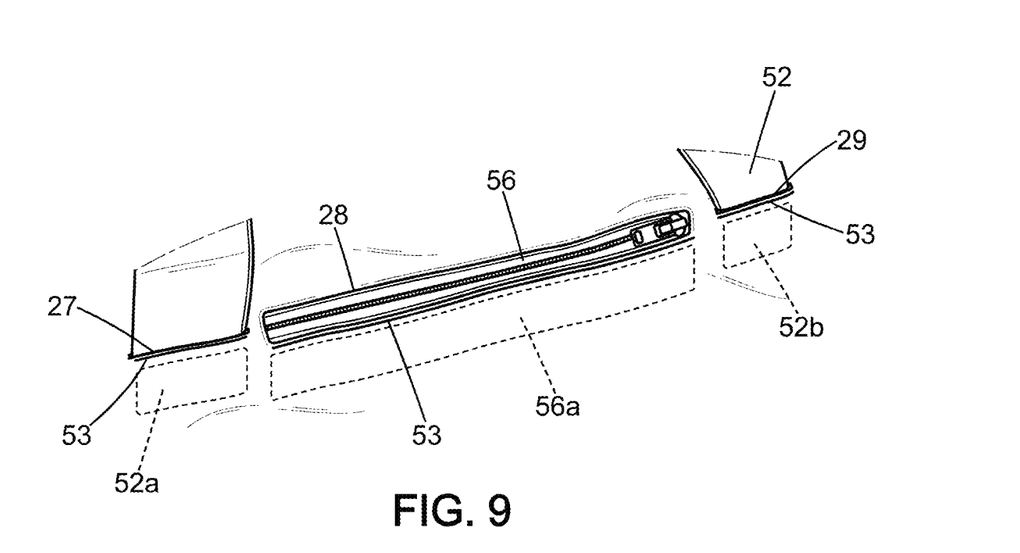
FIG. 9 illustrates an enlargement of the area denoted IX in FIG. 8.

Then, as shown in FIG. 9, glue is placed between the first end portion 52a and the inner surface 10a of the casing before pressing them forcefully against one another. Similarly, glue is placed between the second end portion 52b and the inner surface 10a of the casing before pressing them forcefully against one another. And, a pocket 56 is inserted through incision 28, glue is placed between a portion 56a of the pocket and the inner surface 10a of the casing before pressing them forcefully against one another. A seam 53 is then made near the incisions 27, 28, 29, between the incisions 27, 28, 29 and the glue deposits, in order to reinforce the retention of the first end portion 52a, the second end portion 52b, and the portion 56a of the pocket 56 on the casing 10, and to hide the presence of glue. The same process is followed for carrying strap 54.

A technology search was conducted in order to define the best option for making the incisions 27, 28, 29 with the following constraints:
the incisions must be aesthetically perfect so that they do not have to be covered with another element,
the incisions must not create a "step" when they are covered by a reinforcement (whose role is to ensure the mechanical performance of the assembly),
the incisions must ensure that the cut edge does not fray.
Different technologies have been tested for this, such as:
jet of water: has the disadvantage of not ensuring the absence of a fraying edge or a satisfactory aesthetic appearance;
laser: has the disadvantage of creating a pronounced "step";
blade: has the disadvantage of not ensuring the absence of a fraying edge or a satisfactory aesthetic appearance;
ultrasound: satisfies the above three constraints; ultrasound cutting is advantageous because it does not damage the frame and provides a cleaner finish: by heating locally, it permits a cauterization effect. With a mechanical tool there would be fraying. With the laser the finish would be less distinct because of the higher temperature.

The incisions 27, 28, 29 are therefore preferably made by ultrasound. Alternatively, the incisions 27, 28, 29 could be made by laser, or even by a blade or a jet of water.

Figure 8:
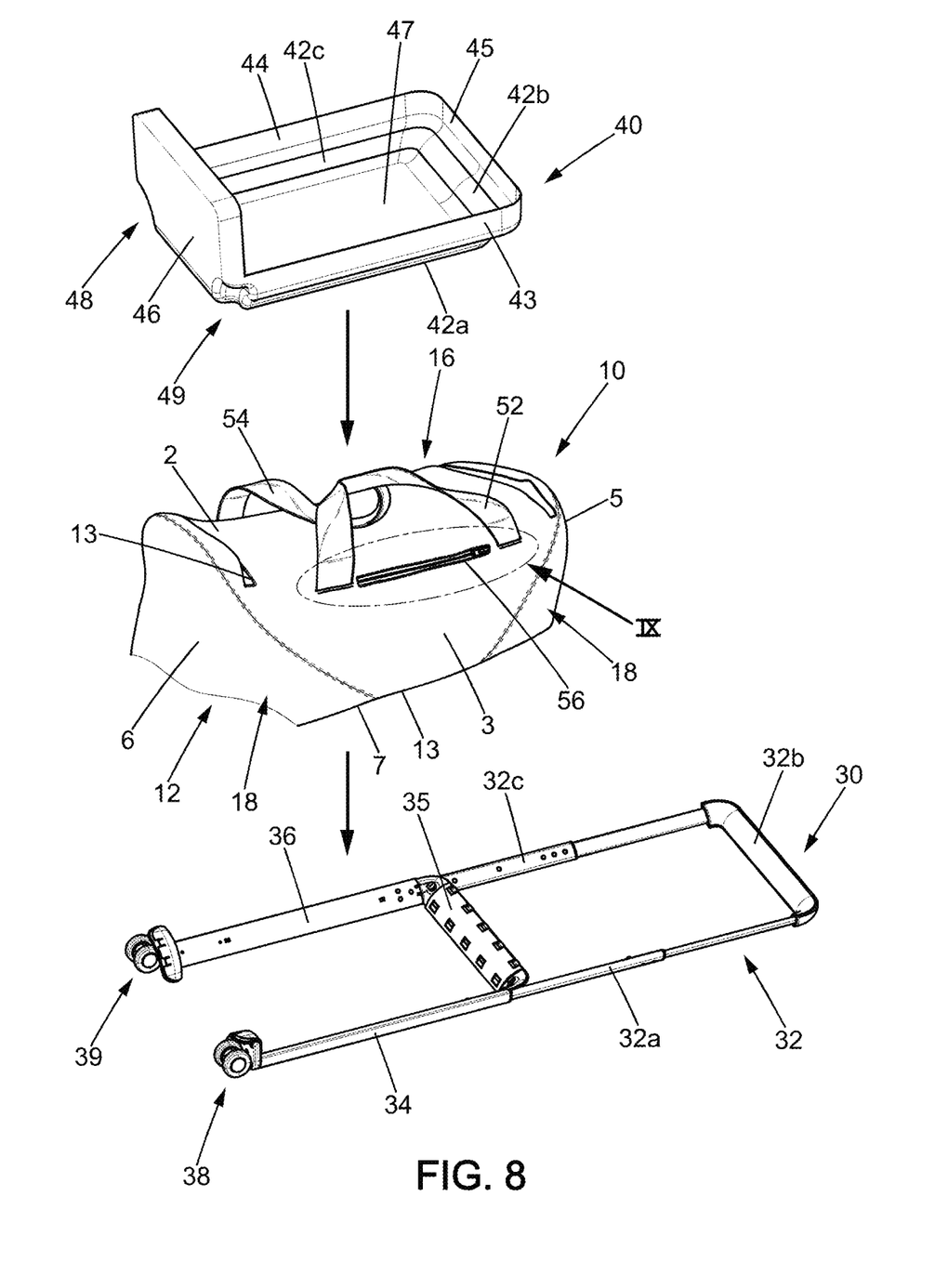
FIG. 8 is an exploded perspective illustration of a fourth operation in the creation of the luggage bag according to the invention.

In addition, as illustrated in FIG. 8, on the one hand a shell 40 is fixed against the inner surface 10a of the casing 10 and on the other hand the pulling device 30 is fixed against the outer surface 10b of the casing. The shell 40 is a single piece and comprises a planar base portion 47, a first longitudinal flange 43, a second longitudinal flange 44, a first transverse flange 45, a second transverse flange 46, as well as a first longitudinal connection portion 42a, a transverse connection portion 42b, and a second longitudinal connection portion 42c.

The first longitudinal connection portion 42a extends between the base portion 47 and the first longitudinal flange 43. The first longitudinal connection portion 42a is concave and complementary in shape to the first tube 34. The transverse connection portion 42b extends between the base portion 47 and the first longitudinal flange 43. The transverse connection portion 42b is concave and complementary in shape to the protective plate 35. The second longitudinal connection portion 42c extends between the base portion 47 and the second longitudinal flange 44. The second longitudinal connection portion 42c is concave and complementary in shape to the first tube 34.

The shell 40 further comprises a first wheel cavity 48 and a second wheel cavity 49.

The base portion 47 extends facing the entire rear face 7 to which it is attached. The second transverse flange 46 extends facing the second transverse face 6 to which it is attached. The first longitudinal flange 43 extends facing a portion of the first longitudinal face 3 to which it is attached. The first transverse flange 45 extends facing a portion of the first transverse face 5 to which it is attached. The second longitudinal flange 45 extends facing a portion of the second longitudinal face 4 to which it is attached. The shell 40 is preferably fixed by gluing to the inner surface of the casing 10, in particular by means of heat-actuated glue.

The first longitudinal portion 13a of the slit 13 is held between the first tube 34 and the first longitudinal connection portion 42a, the first tube 34 and the first longitudinal connection portion 42a each being attached to the casing 10 one on each side of the first longitudinal portion 13a of the slit 13, both on the rear face 7 and on the first longitudinal face 3 of the casing 10. Similarly, the transverse portion 13b of the slit 13 is held between the protective plate 35 and the transverse connection portion 42b, the protective plate 35 and the transverse connection portion 42b each being attached to the casing 10 one on each side of the transverse portion 13b of the slit 13, both on the rear face 7 and on the first transverse face 5 of the casing 10. And, the second longitudinal portion 13c of the slit 13 is held between the second tube 36 and the second longitudinal connection portion 42c, the second tube 36 and the second longitudinal connection portion 42c each being attached to the casing 10 one on each side of the second longitudinal portion 13c of the slit 13, both on the rear face 7 and on the second longitudinal face 4 of the casing 10. Thus, the traction device 30 completely closes the slot 13.

In addition, the zipper 50 is fixed in the access opening 20 to enable closing the access opening 20.

FIG. 9 illustrates the glue attachment of the pocket 56 to the casing 10 and of the carrying straps 52, 54 to the casing 10. The zipper 50 can be fixed on the casing 10 in a manner similar to the pocket 56 and the carrying straps 52, 54.

These two glued assemblies are preferably done using a thermosetting glue, to ensure the strength and non-deterioration of the assembly over time. Such gluing performs well: one side of a carrying strap withstands 150 kg of force before the assembly breaks. However, the constraints related to this type of bonding are the need to apply heat (120/130° C. core temperature in the glue) to liquefy the glue as well as pressure to allow it to wet the two supports. These temperature-raising operations can have an impact on casings that have properties sensitive to temperatures of 110° C. A shift of the gluing process has been developed to maintain the same mechanical performance while ensuring no deterioration of the casing. For this, operations usually done simultaneously are staggered. In other words:

raising the temperature (heating with a heating element) of the glue without contact of the heating element with the casing 10, then pressing the zipper 50 on the casing 10, the pocket 56 and the carrying straps 52, 54 on the casing 10 by an element at room temperature or at least at a temperature below that of the heating element.

Otherwise, the casing 10 is fixed on the shell 40 preferably by means of a polyurethane glue deposited by fiberization. This technology allows depositing hot glue on the shell 40, which then dries and does not immediately adhere on contact, in particular greatly reducing the mass of adhesive per unit area. This thus makes it possible to place the casing 10 on the shell 40.

The assembly is then placed in a vacuum bag in order to exert pressure on all the glued areas. The vacuum bag with the casing 10 set on the shell 40 are put in an oven at 80° C. This temperature is a compromise between the various activation temperatures of the elements and the time to increase the temperature of the glue to liquefy it and allow it to wet the two supports.

The performances obtained with this type of assembly are superior to stitching: during tensile bench tests to evaluate the shear strength, the casing 10 is plastically deformed (irreversible) and the assembly breaks at 50 kg for an assembly surface area of 1.5×2.5 cm.

Finally, a preformed lining (not shown), in particular made of polyester and/or polyurethane, is preferably fixed to the shell 40, to the interior of the shell 40.

Of course, the invention is not limited to the embodiment(s) described here for illustrative, non-limiting purposes. Thus, even if this is not preferred, the sealing device could be formed by the zipper 50. In other words, the zipper 50 could be placed in the slit 13. The casing flap 14 would then form a flap allowing access to the interior volume 11. The zipper 50 would likewise form a closure element making it possible to close off the internal volume 11, by closing the slit 13.

Moreover, instead of being knitted, the casing could be formed from a perforated and deformable structural member. The optional thermoplastic material for stiffening the casing could be provided by covering the structural member with a layer of thermoplastic polymer material. The perforations in the structural member could be made by laser cutting or punching, to form loops extending in two directions of the type illustrated in document EP0806190A1.

The invention claimed is:

1. A method for creating a luggage bag, said method comprising the following operations:
a) creating a one-piece casing having an inner surface and an outer surface, the casing being flexible, the casing having a housing and a flap, the flap being designed for placement in a folded-in position in which the casing has an interior volume and a slit extending between the housing and the flap in a U-shape comprising two longitudinal portions connected by a transverse portion, the slit being one continuous slit, and
b) attaching fixing a pulling device on the outer surface of the casing, the pulling device forming a sealing device on the housing and the flap, at the slit and covering the entire slit.

2. The method according to claim 1, wherein in operation a), the casing is entirely created by knitting, using at least one structural yarn.

3. The method according to claim 2, wherein the at least one structural yarn is knitted with a first density in a first area of the casing and the at least one structural yarn is knitted with a second density in a second area of the casing, the second density being substantially twice the first density.

4. The method according to claim 2, wherein the at least one structural yarn is knitted with a first density in a first area of the casing and the at least one structural yarn is knitted with a second density in a second area of the casing, the second density being greater than the first density.

5. The method according to claim 2, wherein the creation of the casing during operation a) comprises the use of two structural yarns of different colors.

6. The method according to claim 1, wherein:
creating the casing during operation a) comprises the use of a thermoplastic polymer, then
thermoforming the casing.

7. The method according to claim 1, wherein creating the casing during operation a) comprises the use of a polyamide structural material.

8. The method according to claim 1, wherein, during operation b), a rigid shell is fixed to the housing and to the flap, on each side of the slit, over the entire slit.

9. The method according to claim 8, wherein the rigid shell is fixed to the inner surface of the casing.

10. The method according to claim 1, wherein:
the pulling device comprises a telescopic bar, two tubes, and a protective plate, the telescopic bar has two arms and a handle connecting the arms, the arms of the telescopic bar being mounted in the tubes so as to slide between a folded position and an extended position of the bar,
the tubes are fixed on the outer surface of the casing and cover the longitudinal portions of the slit, and
the protective plate is fixed on the outer surface of the casing and covers the transverse portion of the slit.

11. A method for creating a luggage bag said method comprising the following operations:
a) creating a one-piece casing having an inner surface and an outer surface, the casing being flexible, the casing having a housing and a flap, the flap being designed for placement in a folded-in position in which the casing has an interior volume and a slit extending between the housing and the flap, the slit being one continuous slit, and
b) attaching a sealing device on the housing and the flap at the slit
wherein creating the casing during operation a) comprises:
creating the housing with a main face, a first longitudinal face, a second longitudinal face, a first transverse face, and a second transverse face,
creating the flap in substantially flat form, and
the flap is designed to be placed in an open position in which the flap is substantially in the extension of the second transverse face and in the folded-in position, the slit extending around the flap and only along the first longitudinal face, the second longitudinal face, and the first transverse face.

12. The method according to claim 11, comprising:
during operation a) creating the slit in a U-shape comprising two longitudinal portions connected by a transverse portion, and
during operation b), fixing a pulling device on the outer surface of the casing, the pulling device forming a sealing device and covering the entire slit.

13. A method for creating a luggage bag, said method comprising the following operations:
creating a one-piece casing having an inner surface and an outer surface, the casing being flexible, the casing having a housing and a flap, the flap being designed for placement in a folded-in position in which the casing has
an interior volume and a slit extending between the housing and the flap, the slit being one continuous slit, and
attaching a sealing device on the housing and the flap, at the slit,
  making an incision by cutting into the casing,
  inserting an attachment portion of an accessory, through the incision,
  depositing glue between the attachment portion of the accessory and the casing, and
  sewing the attachment portion of the accessory to the casing, near the incision.

14. The method according to claim 13, wherein the casing is cut by ultrasound.

15. A method for creating a luggage bag, said method, comprising the following operations:
creating a one-piece casing having an inner surface and an outer surface, the casing being flexible, the casing having a housing and a flap, the flap being designed for placement in a folded-in postion in which the casing has
an interior volume and a slit extending between the housing and the flap, the slit
being one continuous slit, and
attaching a sealing device on the housing and the flap, at the slit,
  making an incision by cutting into the casing,
  inserting an attachment portion of an accessory, through the incision,
  depositing glue between the attachment portion of the accessory and the casing, and
  sewing the attachment portion of the accessory to the casing, near the incision.

\* \* \* \* \*